Feb. 26, 1957  G. B. DOREY  2,782,879
OPERATING MECHANISM FOR AUTOMATIC SLACK ADJUSTER
Filed June 30, 1954  3 Sheets-Sheet 2
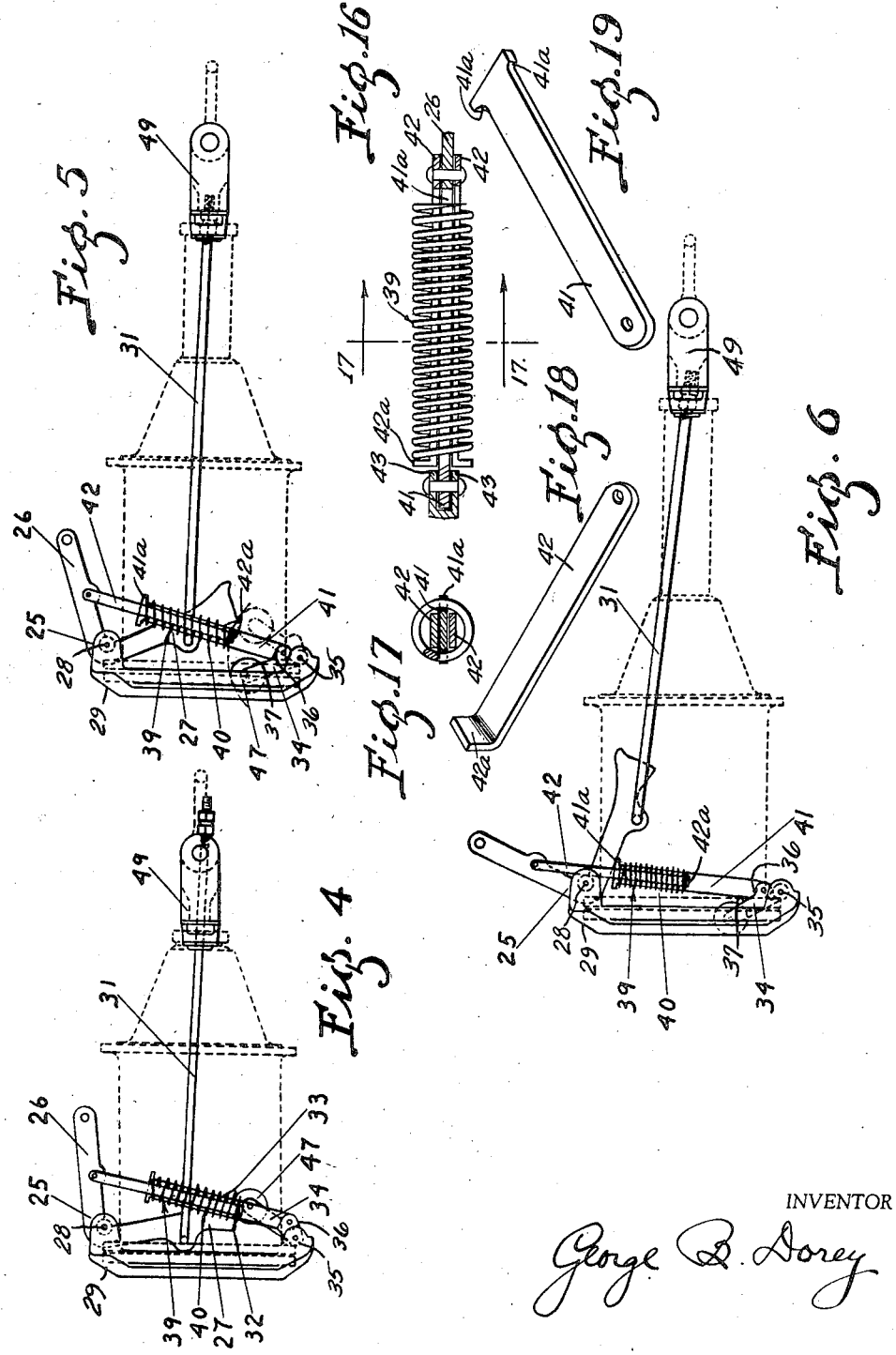
INVENTOR
George B. Dorey

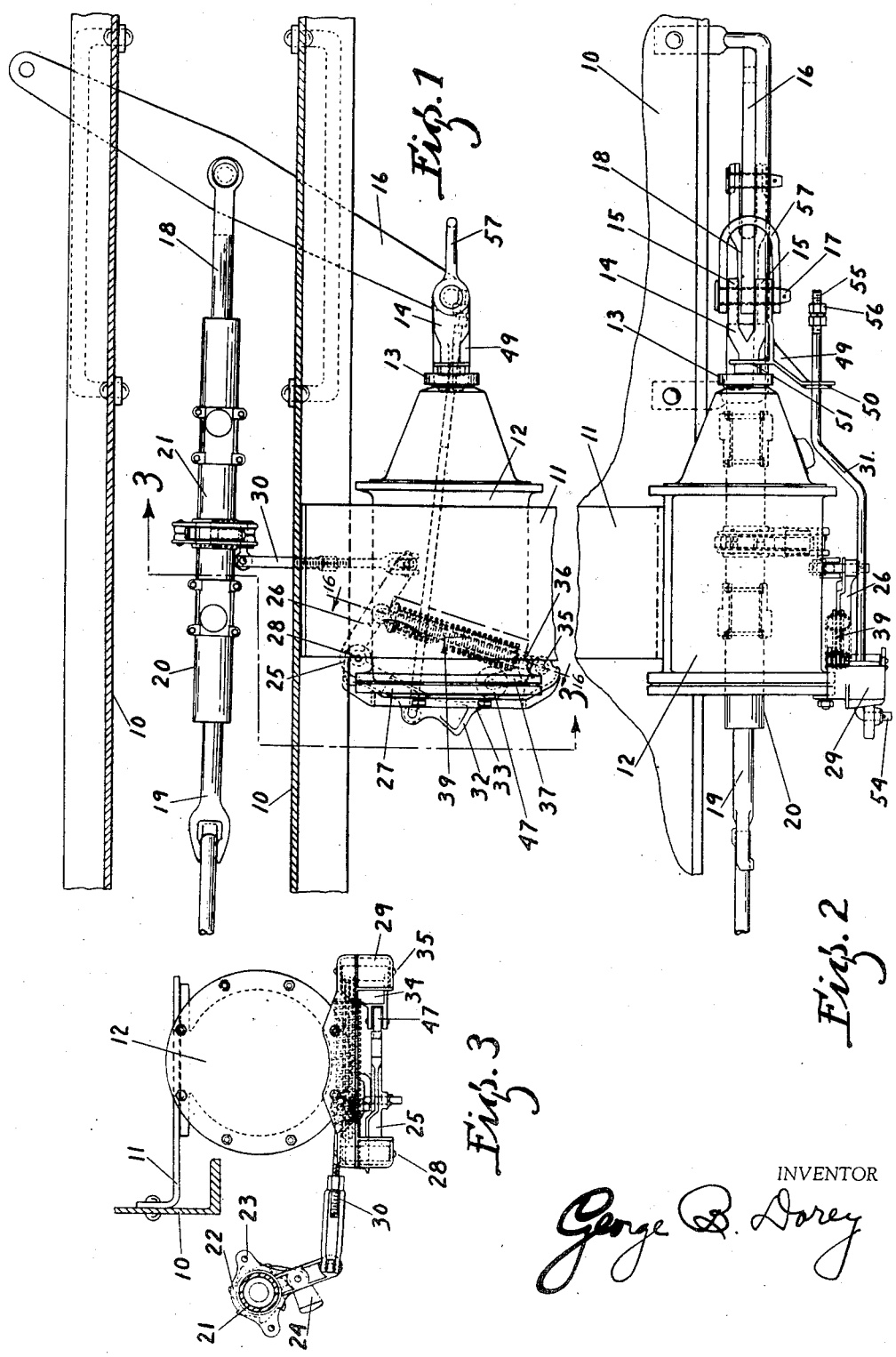

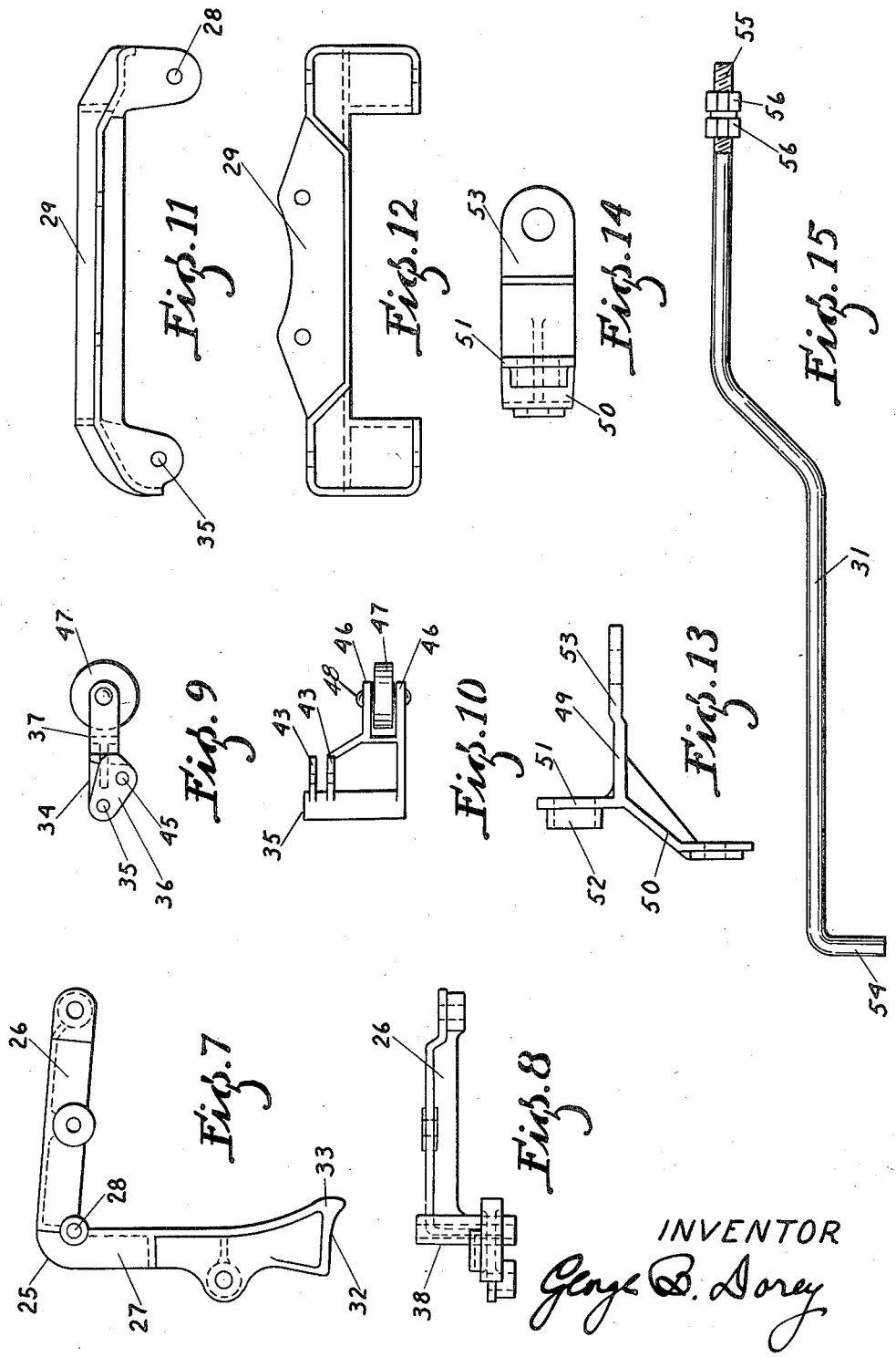

United States Patent Office 2,782,879
Patented Feb. 26, 1957

2,782,879

OPERATING MECHANISM FOR AUTOMATIC SLACK ADJUSTER

George B. Dorey, Montreal, Quebec, Canada, assignor to Continental Transport Appliances, Limited, Montreal, Quebec, Canada, a company of Canada Application June 30, 1954, Serial No. 440,426

5 Claims. (Cl. 188—196)

The invention relates to an improved operating mechanism for an automatic slack adjuster such as employed in connection with the brake of railway cars and the like.

An object of the invention is to provide an improved mechanism for operating a slack adjuster through the release of the energy of a spring or similar device which is energized during the application of the brake and such tension held until adjustment of slack is required.

A specific object of the invention is to provide an interlocking relation between a lever for operating the slack adjuster and a pawl for controlling the movement of said lever whereby one resilient element serves the double function of swinging a lever for taking up slack and also operates the pawl for controlling release of spring energy.

The invention further resides in certain details of construction such as will be more fully pointed out and claimed.

For further comprehension of the invention reference may be had to the accompanying drawings wherein:

Figure 1 is a plan view of a portion of a car underframe showing as much as necessary of the car as to show the application of the invention, said view showing the brake parts in released position.

Figure 2 is a vertical longitudinal elevational view of the structure shown in Figure 1.

Figure 3 is a vertical end view of the structure shown in Figures 1 and 2 as taken on a line 3—3 of Figure 1.

Figure 4 is a partial plan view of a portion of Figure 1 showing the lever and pawl in interlocked relation, said view indicating the operating cylinder and operating rod in conventional broken lines.

Figure 5 is a view similar to Figure 4 except that the lever and pawl are shown positioned as the lever overrides the pawl and release of spring energy is effected.

Figure 6 is a view similar to Figures 4 and 5 except that the parts are shown positioned with the operating push rod fully extended.

Figure 7 is a detached plan view of the operating lever on an enlarged scale.

Figure 8 is a vertical elevational view of the lever shown in Figure 7.

Figure 9 is a detached plan view of the pawl and roller assembly on an enlarged scale.

Figure 10 is a vertical elevational view of the pawl and roller assembly shown in Figure 9.

Figure 11 is a detached plan view on an enlarged scale of the supporting bracket for the lever and pawl.

Figure 12 is a vertical elevational view of the bracket shown in Figure 11.

Figure 13 is a vertical longitudinal elevational detached view on an enlarged scale of the pull bracket on the operating rod.

Figure 14 is a plan view of the bracket shown in Figure 13.

Figure 15 is a vertical longitudinal elevational detached view on an enlarged scale of the pull rod.

Figure 16 is a vertical elevational view on an enlarged scale of the spring assembly as viewed on a line 16—16 of Fig. 1.

Figure 17 is a transverse sectional view taken through the spring assembly as seen on a line 17—17 of Fig. 16.

Figure 18 is a perspective view of one of the pair of spring yoke members.

Figure 19 is a perspective view of the central yoke member.

In said drawings the underframe of the car is indicated by longitudinally extending center sills 10—10 having a bracket 11 secured thereto and which in turn carries the air operated cylinder 12. The cylinder 12 is provided with a hollow push rod, the outer end of which is indicated at 13 and loosely mounted within said hollow rod 13 is an operating rod 14. The outer end of operating rod 14 is provided with a pair of jaws 15—15 between which is sandwiched one end of a brake lever 16, and the jaws and lever are pivotally united by a pintle 17. The said lever 16 is connected intermediate its ends with other parts of the brake leverage system by a connection which is divided lengthwise into oppositely screw threaded sections 18 and 19 united by a take up device indicated generally at 20 having complementary screw threaded nuts (not shown) engaging with the screw threaded ends of the rods whereby the length of the connection is altered by rotation of the take up device.

The present invention is concerned with the mechanism whereby such rotation is effected and in the means employed for effecting the take up operation at a predetermined extent of piston travel.

Rotation of the take up device is effected by step by step movements and to this end there is fixedly mounted on the housing 21 a ratchet wheel member 22 and cooperating with the ratchet wheel member is a lever 23 which is mounted to swing freely on the housing and which carries a weighted pivoted pawl 24 for engagement with the teeth of the ratchet wheel when the said lever is swung in one direction and movable freely independently of the ratchet wheel when swung in the opposite direction.

The mechanism for swinging the lever arm is that part of the structure with which the instant invention is particularly concerned and will now be described. The said operating mechanism includes a bell crank lever 25 which includes angularly related arms 26 and 27 and is pivotally mounted at 28 adjacent one end of a bracket 29. The arm 26 is connected with the lever arm 23 of the take up device by means of a link 30 adjustable in length and the other arm 27 of the bell crank lever is connected with the operating rod 14 through the medium of a connecting rod 31.

The lever arm 27 is preferably of segmental form with the swinging edge 32 of arcuate shape and preferably concentrically disposed with relation to the pivotal axis of the lever. A lug 33 is provided on the lever 27 to project outwardly beyond the arcuate shaped surface 32 and co-operating with said lug is a pawl 34 for controlling the swinging movement of said lever 25 as will be hereinafter explained.

The pawl element 34 is pivotally mounted at 35 on the end of the bracket 29 remote from pivot 28 and the said pawl is provided with arms 36 and 37 leading outwardly radially from the pivot 35. The said respective arms 36 and 37 preferably extend in different angular directions and are separated from each other vertically, the arm 36 being parallel with arm 26 and the arm 37 parallel with arm 27 of the lever. It will be observed that the arms 26 and 27 of the lever 25 are likewise disposed in different planes and extend from a post-like section as indicated at 38 (see Fig. 8).

Connecting the arm 36 of the pawl element and the arm 26 of the bell crank lever is a resilient element 39 which preferably consists of a compression spring 40 and shouldered yoke members 41 and 42, the latter consisting of two members disposed on either side of yoke member 41.

The yoke member 41 is formed with laterally extending portions 41a which constitute the shouldered part of the member and yoke members 42 each include a bent section 42a which abuts the spring and constitutes the shouldered part of the member.

The yoke members 41 and 42 extend in opposite directions from their shouldered ends and the spring 40 lies intermediate said shoulders of the respective yoke members.

The single yoke member 41 connects with arm 36 of the pawl element 34 and the said arm 36 consists of a pair of walls 43—43 (see Fig. 10) between which the member 41 lies and is pivotally connected thereto by a rivet. The double yoke member 42 straddles the arm 26 of the lever and is pivotally connected thereto by a rivet.

The arm 37 of the pawl element consists of two walls 46—46 between which is inserted an anti-friction roller 47. The roller 47 which is pivotally mounted on pivot 48 is disposed in alignment with the arcuate surface 32 of the bell crank lever arm 27 and constitutes the detent of the pawl assembly.

The compression spring 40 by virtue of the shouldered yoke members operates as a compression member between the lever arm 26 and the pawl element 34 and at all times maintains tautness between the lever arm 26 and the pawl element 34 thus serving to bias the latter to operative positions.

The connection 31 connects with the operating rod 14 through the medium of a bracket member 49 which includes a depending portion 50 which supports the forward end of the connection 31. The bracket 49 (see Fig. 13) includes an upstanding wall 51 which is apertured at 52 to encircle the stem of the operating rod 14 and the bracket is maintained against lengthwise movement by a platelike extension 53 which lies between the lower jaw of the operating rod and a clevis 57 and also receives the lever pintle 17.

The rod 31 which extends between the arm 27 of the bell crank lever and the bracket 49 extends centrally below the air cylinder and is bent downwardly at 54 to connect with lever 27 and at its forward end is provided with a screw threaded section 55 which takes complementary screw threaded nuts 56—56. The downward extension 50 of the bracket 49 is arranged to engage the nut abutment 56 in order to effect movement of the bell crank lever by movement of the operating rod 14.

With the brake in released position as shown in Figs. 1, 2 and 3 the compression of the spring 40 maintains the detent roller in the path of swinging movement of the lever 27 and is adapted to be displaced thereby. With the parts in release position as shown in Figs. 1 to 3 inclusive, it will be noted that nut abutment 56 is spaced appreciably beyond the abutting surface of the downward extension 50 of the bracket 49 in order to provide an appreciable extent of movement of the operating rod 14 before effecting movement of the bell crank lever 25.

The operation of the device may be best understood by following out the sequence of operations involved in a complete cycle of the operating mechanism. Assuming the parts to be in released position as shown in Figs. 1, 2 and 3, and that air is admitted in the cylinder there will be a forward movement of the operating rod 14 which will move independently of the connection 31 until the distance between the extension 50 of the bracket 49 makes contact with nut 56. Continued movement of the rod 14 in the indicated direction moves the rod 31 taking along the lever arm 27 and increasing the compression of the spring 40 as the arm 26 swings outwardly. As the forward movement of the lever arm 27 continues, the detent is displaced by the lug 33 and by reason of the spring compression is biased against the arcuate surface 32 of the lever arm 27 and the lug 33 holds the spring compression independently of the connection 31 and operating rod 14 as shown in Fig. 4. With the spring energy retained as in Fig. 4, the operating rod 14 and brake parts are free to move to release position and during subsequent brake applications with increased travel of the operating rod 14 the roller detent will continue to contact the arcuate surface 32 during successive brake applications or until sufficient travel of the operating rod causes the lever 27 to override the roller 47 as shown in Fig. 5 and the spring energy is then released and the take up device rotated in a direction to take up slack.

The roller detent during the releasing movement of the spring assumes an overbalanced inoperative position and upon completion of the spring release movement the pawl assembly returns to the position shown in Figs. 1, 2 and 3.

It will be observed that the device provides for accurate control of the take up operation at a predetermined extent of travel of the operating rod 14 and the interlocking of the controlling pawl and operating lever by a common spring assures that both lever and pawl will become inoperative should the spring fail and thus offers a safeguard against short piston travel such as would take place if the controlling pawl and operating lever had independent springs and the pawl spring failed. The arrangement further allows for full emergency travel of the piston as shown in Fig. 6 and thereby assures for the full range of movement of the brake applying piston in the event of failure of the take up device to take up slack as intended.

What I claim as new is:

1. In a slack adjuster for the brake leverage system of a railway car having a power operated cylinder and an operating rod actuated thereby for applying the brake, said leverage system including a take-up device for varying the relation between certain parts of the system and thereby compensate for slack; the herein described improved operating mechanism for operating the take-up device including a support bracket stationarily mounted with respect to the cylinder, a bell crank lever having angularly related arms pivotally mounted on the bracket, said lever having one arm connected with the take up device and the adjacent arm connected with the operating rod; a pawl pivotally mounted on the bracket beyond the swinging edge of one of the arms of the bell crank lever and extending from its pivot towards the pivot of the bell crank lever for holding engagement with the swinging edge of the said arm upon the attainment of a predetermined extent of pivotal movement of the lever; and a spring interconnecting the lever and the pawl for biasing the latter into engagement with the lever and swinging the latter in a direction to take up slack, said operating rod upon movement in a brake applying direction effecting a swinging movement of the bell crank lever thereby energizing the spring and biasing the pawl to engage the swinging edge of the related lever arm at the predetermined extent of swinging movement of the lever and holding the spring energized independently of said operating rod, said bell crank lever upon continued movement of the operating rod in a brake applying direction beyond a predetermined location being arranged and adapted to override the pawl and release the spring energy to operate the take up device.

2. In a slack adjuster for the brake leverage system of a railway car having a power operated cylinder and an operating rod actuated thereby for applying the brake, said leverage system including a take up device for varying the relation between certain parts of the system and thereby compensating for slack, the herein described improved operating mechanism for operating the take up device including a supporting bracket stationarily mounted with respect to the cylinder and a bell crank lever pivotally mounted on said bracket and having one arm connected with the take up device and a second arm connected with the operating rod whereby the lever is swung in one direction by the operating rod as the latter is moved to apply the brake and a pawl pivotally mounted beyond said second arm and having a body portion extending from its pivot towards the last named arm and adjacent its outer end, said pawl having an anti-friction roller adapted to engage with the swinging edge of the lever arm, and a spring interconnecting the first named arm of the lever and the pawl, said spring being energized by swinging movement of the lever effected by movement of the operating rod in a brake applying direction and during such movement the roller end of the pawl being displaced to engage with the swinging edge of the lever arm and retain the spring energized independently of the operating rod and said lever upon continued movement of the operating rod in the indicated direction being adapted to override the roller of the pawl at a predetermined extent of travel of the operating rod and release the spring energy to operate the take up device.

3. In a slack adjuster for the brake leverage system of a railway car having a power operated cylinder and an operating rod actuated thereby for applying the brake, said leverage system including a take up device for varying the relation between certain parts of the system and thereby compensating for slack; the herein described improved operating mechanism for operating the take-up device including a supporting bracket stationarily mounted with respect to the cylinder, a lever pivotally mounted on the bracket adjacent one end thereof, said lever having angularly related arms respectively interconnected with the take up device and with the operating rod; a pawl pivotally mounted on the end of the bracket remote from the pivotal mounting of the bell crank lever and extending towards the arm connected with the operating rod to lie in the path of swinging movement of said arm and engage therewith in holding relation at a predetermined extent of swinging movement of the bell crank lever; and a spring interconnecting the pawl and the arm connected with the take up device to bias the pawl into holding engagement with the bell crank lever and also move the bell crank lever in a direction to take up slack, said spring being energized by swinging movement of the bell crank lever under the influence of the operating rod as the latter is moved in a brake applying direction and said pawl being displaced by movement of the related bell crank lever arm to engage with the swinging edge of said lever arm at a predetermined extent of travel of the operating rod to retain the spring energized independently of the operating rod.

4. In a slack adjuster for taking up slack in the brake leverage system of a railway car having a power cylinder and an operating rod actuated thereby for applying the brake and a take up device in the leverage system operable by rotation for taking up slack in the system, said device including a swinging lever and ratchet rotating means for rotating the take up device by swinging movement of the swinging lever; the herein described improved mechanism for operating the take up device including a support bracket stationarily mounted with respect to the cylinder; a bell crank lever pivoted on the bracket and having one arm connected with the lever of the take up device and the adjacent arm connected with the operating rod; a pawl pivotally mounted on the bracket at a location remote from the pivot of the bell crank lever adapted to holdingly engage with the swinging edge of one of the lever arms, and a spring connected with the pawl and with the bell crank lever for moving the latter in a direction to operate the take up device and also bias the pawl into holding engagement with the bell crank lever, said spring being energized by movement of the bell crank lever under the influence of the operating rod moving in a brake applying direction, and said pawl being arranged and adapted to holdingly engage with the edge of an arm of the bell crank lever for retaining the spring energized independently of the operating rod and holding said spring energized until a predetermined extent of movement of the operating rod is attained.

5. In a slack adjuster for the brake leverage system of a railway car having a power cylinder and an operating rod actuated thereby and connected to the brake system for applying the brake by movement of said operating rod, said brake system including therein a take up device operable by rotation for varying the relation between certain parts of the brake system and thereby compensating for slack; the herein described mechanism for operating the take up device including a supporting bracket stationarily mounted with respect to the cylinder and a bell crank lever pivotally mounted on the bracket and having one arm connected with the take up device and a second arm connected with the operating rod for swinging the bell crank in one direction by movement of the operating rod in a brake applying direction; and a spring connected to the lever for swinging the latter in a direction to take up slack, said spring being energized by movement of the operating rod in a brake applying direction; and means for retaining the spring energized independently of the operating rod, said means including a pawl pivotally mounted on the bracket beyond the swinging edge of the bell crank lever and having a body portion extending from its pivot towards the bell crank lever to engage with the latter at a predetermined extent of swinging movement of the lever, said pawl being connected in series with the operating spring whereby the latter serves to operate the take up device and also bias the pawl to operative positions.

References Cited in the file of this patent

UNITED STATES PATENTS

| | | |
|---|---|---|
| 754,246 | Scott | Mar. 8, 1904 |
| 1,815,859 | Martin | July 21, 1931 |
| 2,646,141 | Dorey | July 21, 1953 |